Sept. 20, 1971 F. K. HALL 3,605,574
LIQUID IMPERVIOUS EXPANSION JOINT
Filed May 21, 1969 2 Sheets-Sheet 1

INVENTOR.
FRANK KENNETH HALL
BY
*Wilson & Fraser*
ATTORNEYS

Sept. 20, 1971  F. K. HALL  3,605,574
LIQUID IMPERVIOUS EXPANSION JOINT
Filed May 21, 1969  2 Sheets-Sheet 2

INVENTOR.
FRANK KENNETH HALL
BY
William Fraser
ATTORNEYS

United States Patent Office 3,605,574
Patented Sept. 20, 1971

3,605,574
LIQUID IMPERVIOUS EXPANSION JOINT
Frank K. Hall, 1120 Country Club Drive,
Findlay, Ohio 45840
Filed May 21, 1969, Ser. No. 826,409
Int. Cl. E01c 11/10
U.S. Cl. 94—18                                17 Claims

ABSTRACT OF THE DISCLOSURE

An expansion joint assembly having a seal in the form of a resilient right-circular cylinder having a rolling contact with superposed surfaces of cooperating relatively moveable joint elements. The surfaces are advantageously planes oriented parallel to the direction of relative movement. Where the joint is subject to loads, as in roadway joints, the seal cylinder is preloaded to the order of the maximum anticipated loading to minimize its deflection when loaded by vehicles riding across its surface.

BACKGROUND OF THE INVENTION

It has been recognized that provisions must be made to accommodate thermally induced expansion and contraction over large surface areas. Various forms of compressible and elongatable junctions between sections of structures having large surface areas have been proposed. Highway joints, particularly for highway bridge decking, are now sought to be constructed in a fluid impervious form to avoid corrosion and erosion of the underlying structure by solutions of the melting agents applied to the road surfaces.

Where a seal has been attempted for expansion joints, the expense of the joints has been increased substantially and in highway structure, the seal has beeen less than perfect and subject to rapid deterioration even when complex structures have been employed. The repetitive impacts of heavy vehicles and the working of foreign matter into the sealing region of the joint has been particularly detrimental to sealed expansion joints.

SUMMARY OF THE INVENTION

The present invention relates to expansion joints and more particularly to such joints for broad surfaces where the joint is sealed against the passage of fluids.

One embodiment of this invention as applied to highway expansion joints comprises a pair of plates having a length parallel to the joint with an upper face of one plate generally in plane with the pavement surface. A second plate is maintained in registry with the first plate and one or more resilient, right-circular cylinders is confined between the first and second plates with their longitudinal axes parallel to the length of the joint and thus normal to the direction of relative movement of the first and second plates as the pavement expands and contracts in its major plane. These cylinders provide rolling seal elements to accommodate relative movement between the plates. A pair of such couplings can be combined where the underlying plates are secured to opposed adjacent sections of pavement and the overlying plate can span a portion of each underlying plate and the intervening gap. Augmenting clamp means can be provided to prestress the rolling seal elements by forcing the upper bridging plate toward the underlying plates. Drains can be arranged to carry liquids out of the interstices of the interfitting elements. Cleaning means in the form of wipers can be applied to remove dirt from the rolling path of the seal elements. The entire assembly can be arranged for convenient assembly and disassembly as for servicing.

In accordance with the above, one object is to improve expansion joints.

Another object is to seal expansion joints against the passage of liquid.

A third object is to mechanically stabilize expansion joints by preloading them.

DESCRIPTION OF PREFERRED EMBODIMENTS

Figures 1, 2, 3:
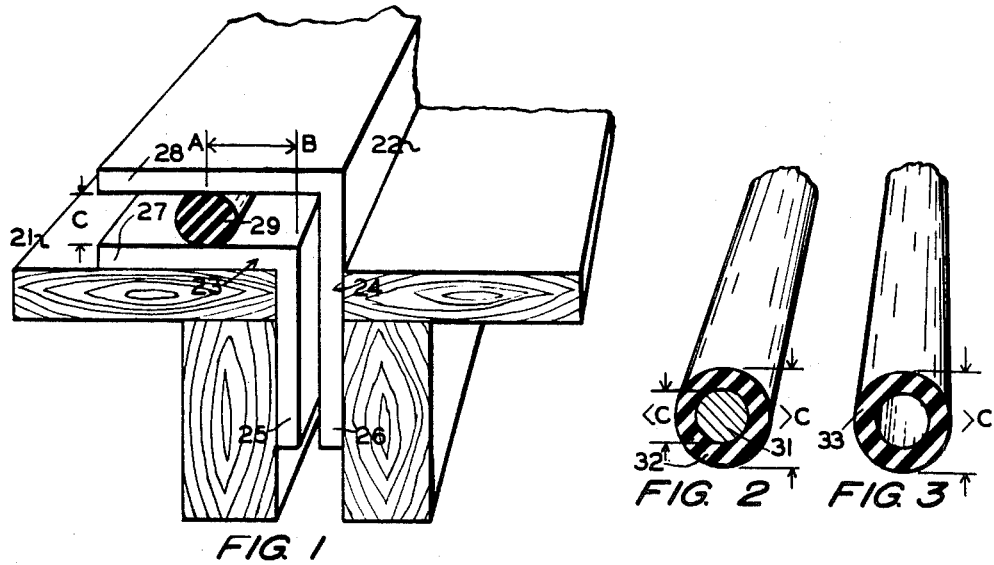
FIG. 1 is a fragment of a perspective view of an elementary form of a sealed expansion joint according to this invention taken from the end of a joint unit.
FIGS. 2 and 3 are perspectives of portions of rolling seal elements which can be substituted for that shown in FIG. 1.

One simple form of sealed expansion joint as might be employed in a roof construction to accommodate thermal expansion and contraction is shown in FIG. 1. In this elemental form two sections of roof 21 and 22 are constructed in spaced relation at their adjacent section margins with a pair of inverted and nested L-shaped strips 23 and 24 providing the base elements of the joint. Each L has a generally vertical leg 25 and 26 which is secured to the margin of a roof section and a generally horizontal leg 27 and 28 spaced from each other vertically and adapted to be moveable relative to each other horizontally. A rolling seal in the form of a right circular cylinder 29 of a resilient, compressible material, an elastomer, and having an unconstrained diameter somewhat greater than the vertical spacing of legs 27 and 28 prevents the passage of water or other liqquids from the upper surface of the roof through the space between the vertical legs 25 and 26.

A seal is maintained in FIG. 1 by insuring at least a line contact of cylinder 29 with the adjacent faces of legs 27 and 28 along their lengths. This is accomplished by so relating the diameter of cylinder 29 to the spacing of the legs that the cylinder is flattened slightly to generally broaden the contact area to a band generally tangent to the distorted circular cross-section of the cylinder. Liquids to the left of the rolling seal are prevented from flowing past the bands of contact with legs 27 and 28 and instead, in a surface where the joint is installed with one end higher than the other flow along the length of the joint to run off at its ends. Alternatively, the seal can be normal to the pitch in which case the open region on the left in FIG. 1 should be on the low side of the unit to drain away from the seal.

In this relationship as sections 21 and 22 move relative to each other in a horizontal separation between vertical legs 25 and 26 the cylinder rolls diametrically opposed regions on the horizontal legs 27 and 28 while maintaining a band of contact with each face to bar the passage of liquid. The rolling motion of cylinder 29 results in a displacement of the contact band on each of legs 27 and 28 which is one-half the relative movement of strips 23 and 24 in the horizontal direction. Thus the joint has a range of accommodation of motion twice the tolerable range of rolling contact on the most limited bearing surface for cylinder 29, surface 27 in the example. If a reasonable range for the center of the cylinder 29 on leg 27 is considered to be the distance AB and if the joint is closed, with vertical leg 25 abutting vertical leg 26 and the center of the cylinder in a plane normal to legs 27 and 28, parallel to their length and running through line A at the outermost limit of the range, then the range of expansion of the sealed joint is twice AB in the direction parallel to the planes of legs 27 and 28.

In the example of FIG. 1, the rolling seal can take a number of forms. In each form, it must be resilient, have a diameter exceeding the vertical spacing C of legs 27 and 28, be deformable to a thickness C and have suitable physical properties for its intended environment. Thus, it must retain its resilience and deformability over a reasonable life, at the temperatures to be anticipated, when subjected to the atmospheres and liquids of the environment and foreign matter such as grit or dirt to be encountered.

A solid elastomer cylinder as shown in FIG. 1 can be replaced as shown in FIG. 2 by a rigid rod 31 encased in elastomeric material 32 where the rod is sufficiently smaller in diameter than spacing C to permit its elastomeric casing to be nondestructively deformed to that spacing.

A hollow rolling seal element 33 is shown in FIG. 3. It can comprise an elastomer tube of right circular section. Such an element cannot support any appreciable load and thus is not satisfactory for certain applications requiring substantial load bearing capability as will be described. It is to be appreciated that any element which is deformable, can be rolled on opposed surfaces, and maintains a positive force on those surfaces will provide a sealing action for joints according to this invention.

Figure 4:
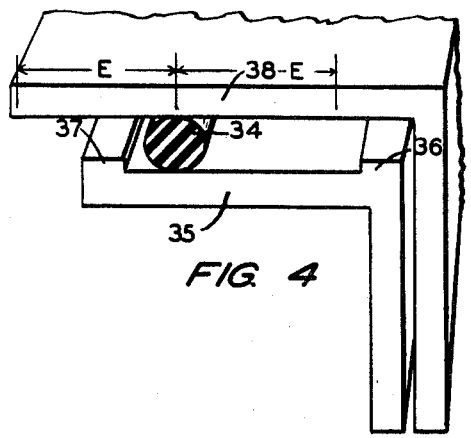
FIG. 4 is a perspective of a portion of another form of sealed expansion joint according to the invention.

Stops are provided for the rolling seal 34 in FIG. 4 by providing leg 35 with upstanding flanges 36 and 37. The measure of the range of expansion is the distance between seal centers E. Accordingly, range of motion on the upper horizontal leg 38 of the joint must include a surface width exceeding a distance E from the outermost position of the rolling seal 34 illustrated. Thus, if the joint can close to a gap of the degree illustrated between its vertical legs 39 and 41 it can open to 2E plus the illustrated gap.

Figure 5:
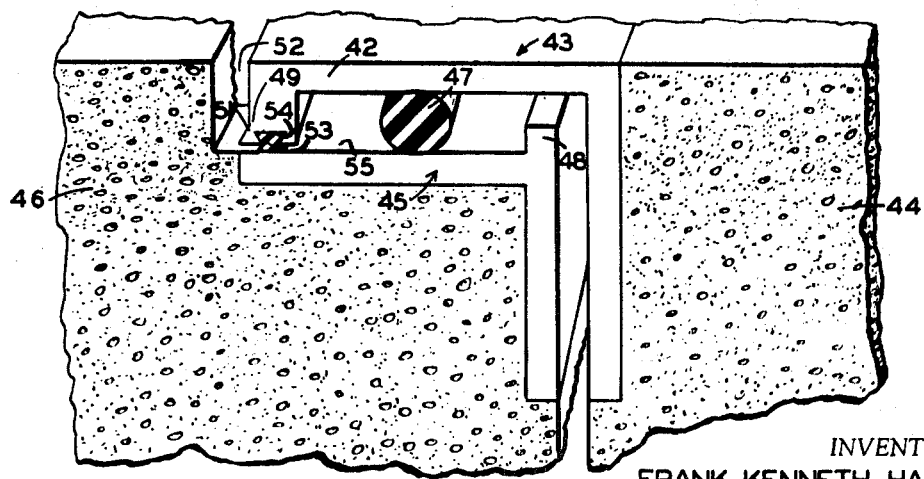
FIG. 5 is a perspective of a portion of a road pavement expansion joint of the invention.
Figure 6:
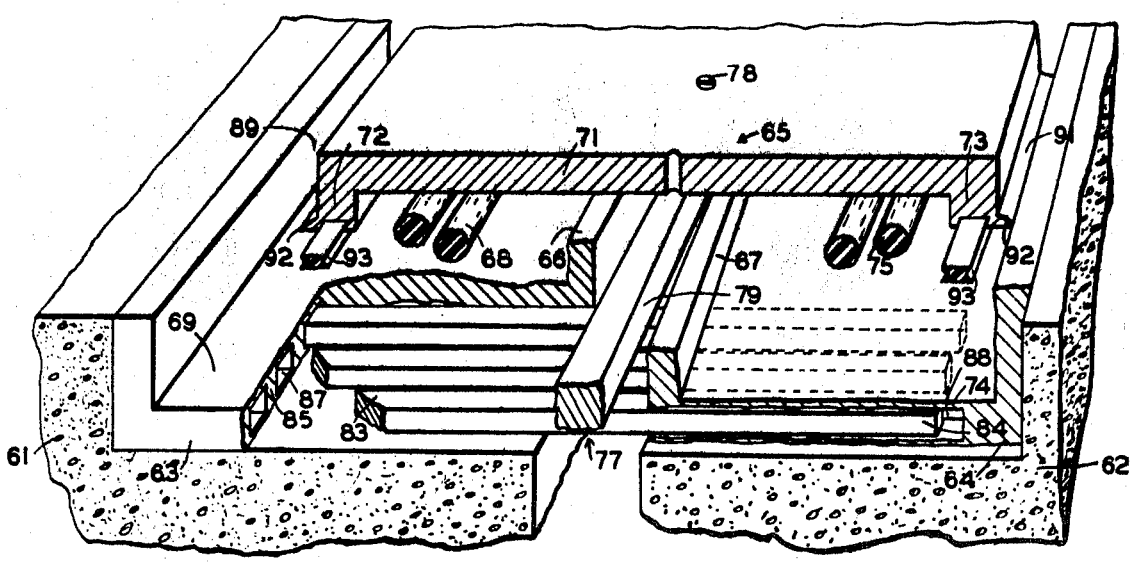
FIG. 6 is a perspective of a portion of a road pavement joint as can be employed in bridge decking, shown in the closed position with portions broken away to reveal details of construction.

A joint of the type employed to accommodate road pavement expansion wherein the uppermost horizontal leg 42 is periodically subjected to the loading of vehicles is shown in FIG. 5. This joint is cast or otherwise secured to the pavement with its cap section 43 secured to slab 44 and its base section 45 secured to slab 46. The cap section 43 is assembled in the joint to impose a deforming force on the rolling elastomer seal 47 of a magnitude sufficient to deflect the cylinder to a degree that it will sustain axle loads to be experienced when vehicles pass over the joint without appreciably greater deflection. In particular, metal-to-metal contact between stops 48 and 49 and the opposed joint sections 43 and 45 respectively is to be aovided. If the loading is such that one rolling seal 47 will not sustain it, a plurality of such seals can be employed.

Further refinements of the joint of FIG. 5 over those previously described include the transposition of stop 49 from the base section 45 to the cap section 43 whereby stop 49 also acts as a barrier against the admission of foreign solids into the region of the seal. Another feature is the formation of a camming face 51 on the flange stop 49 with an upwardly inclined leading edge to scrape foreign matter free of the trough 52 in which leg 42 and stop 49 reciprocate. An additional adjunct is a wiper gasket 53 of a flexible, resilient material, advantageously an elastomer, locked into groove 54 in the lowermost face of stop flange 49 so that it makes a wiping contact with the upper face of the horizontal leg 55 of base section 45. The elastomer is secured in groove 54 by providing undercut sides for the groove. All of these elements tend to maintain the bearing faces and the rolling seal free of incompressible materials which might damage the seal.

Expansion and contraction of the pavement of FIG. 5 is restricted to a range defined by the separation of the stops 48 and 49 when the gap bridged by the joint is of minimum width less the horizontal dimension of the rolling seal 47 when loaded. In the fully closed position of the joint, seal 47 is centered between stops 48 and 49 so that as the joint opens, the seal rolls to the left on cap section 43 and to the right on base section 45.

Drainage of liquids from the exposed trough 52 and the region to the left of rolling seal 47 in the joint is by gravity due to the pitch with which the pavement is installed. Liquids will run to the end of the joint at the side of the roadway or deck and can drain into a suitable runoff mechanism or gutter (not shown).

The expansion joint of FIGS. 6 to 9 is arranged to block the flow of liquid from the road surface, particularly solutions of ice melting salts, onto the support structure and machinery of a bridge in the deck of which it is incorporated. Concrete slabs 61 and 62 of the road bridge decking are spaced in a manner and degree well known to accommodate thermal expansion and contractions of the decking. The sealed joint extends the width of the slabs it joins and may be made up of a number of units in end-to-end relationship. Each unit comprises a pair of opposed base channels 63 and 64 set into the respective slabs and anchored thereto by suitable means (not shown). A cap 65 in the form of an inverted channel bridges the gap between adjacent flanges 66 and 67 of base channels 63 and 64. A rolling seal comprising one or more right-circular cylinders 68 of resilient material engage the web 69 of channel 63 and the web 71 of channel 65 to support channel 65 on channel 63 with its flange 72 extending toward but short of web 69. Flange 66 of channel 63 extends toward but short of web 71 and with flange 72, defines the limits of extension of the joint and the region to which rolling seals 68 are confined.

The relationship of base channel 64 to cover channel 65 is similarly established by interfitting flange 73 from 65 extending to, but short of web 74 and flange 67 extending to, but short of web 71. Rolling seal 75 supports web 71 on web 74.

Figure 7:
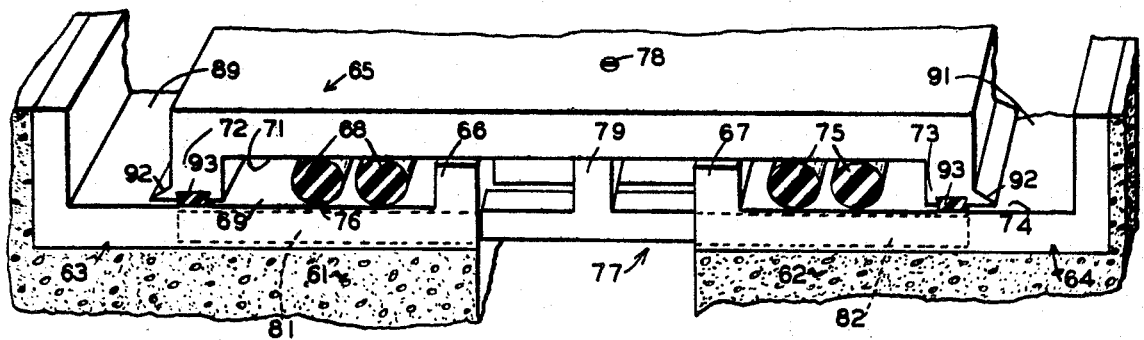
FIG. 7 is a perspective view of a portion of the end of a joint unit of FIG. 6 shown in the partially opened position.
Figure 8:
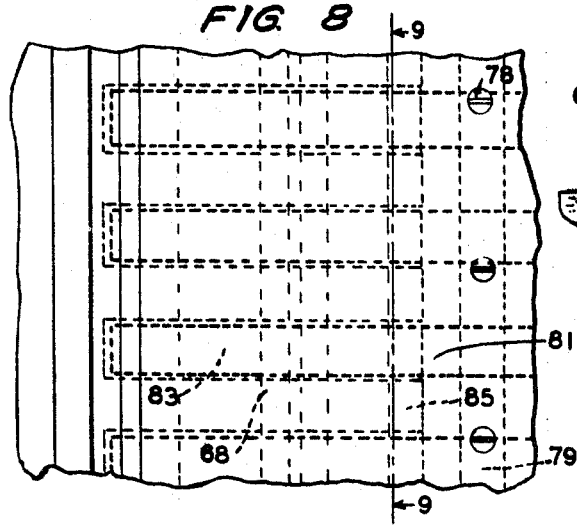
FIG. 8 is a plan view of a portion of the joint of FIG. 6 with portions broken away.
Figure 9:
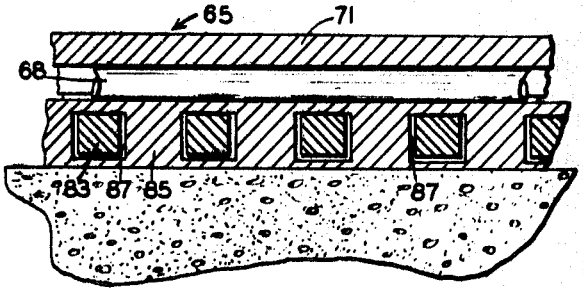
FIG. 9 is a sectioned elevation of FIG. 8 taken along line 9—9.

A range of accommodation of the joint extends between the fully closed condition, experienced under high temperatures, where the outer faces of flanges 66 and 67 have no more space in which to be displaced toward each other and the outer faces of flanges 72 and 73 are similarly confined, and the partially opened condition shown in FIG. 7, where the inner faces of flanges 72 and 73 respectively approach the inner faces of flanges 66 and 67 to a degree accommodating the rolling seal elements.

Liquids are sealed against flowing between the slabs 61 and 62 by means of the rolling seals 68 and 75. In order to be effective, these seals must yield sufficiently to conform to any irregularities in the surfaces of webs 69 and 71 and engage those surfaces with a contact greater than a line of tangency, as a band of some width as represented at 76. Highway decking is subjected to axle limit loadings as vehicle pass. The joint of this invention has plate 65 supported entirely on resilient cylinders 68 and 75. Loadings of those cylinders to a degree depressing the ends of flanges 72 and 73 into metal to metal contact with webs 69 and 74 and ends of flanges 66 and 67 into contact with web 71 is undesirable from the standpoint of wear, noise and mechanical alignment. In order to minimize such deflection of the cylinders 68 and 75 by traffic loads, the cylinders are prestressed in compression to a degree such that the application of the load limits anticipated will cause only a small additional deflection of an amount which will not permit channel 65 to bottom out in channels 63 and 64. This is accomplished by means of loading clamp 77 secured to channel 65 by bolts 78.

Clamp 77 is T-shaped in cross section with the base 79 of the T abutting the web 71 of channel 65 on its underside and the arms 81 and 82 of the T extending from base 79 beneath the webs 69 and 74. Loading clamp 77 has a height such that when it is pulled against cover channel 65 by tighting bolts 78, rolling seals 68 and 75 are loaded to the required degree. The arms of the T are an array of spaced bars suitably secured to base 79 to project therefrom as comb teeth 83 and 84, when viewed in plan in FIG. 8 and in section in FIG. 9, which interdigitate with teeth 85 and 86 on the lower faces of webs 69 and 74 of the base channels. These base teeth have pockets 87 and 88 slightly exceeding the width of teeth 83 and 84 respectively to provide guides or slots in which the teeth slide as the joint is extended and contracted.

Dirt tends to collect in the troughs 89 and 91 between the outer side of the flanges of cover channel 65 and the inner side of the flanges for base channels 63 and 64. Means are provided to minimize the dirt which reaches rolling seals 68 and 75 and their bearing surfaces. Such means include a lip 92 on the lower portion of flanges 72 and 73, to act as a scraper and to cam large pieces of foreign matter from the trough bottom, and a wiper 93 of a resilient elastomer on the lower face of flanges 72 and 73 arranged to engage and wipe webs 69 and 74.

The joint unit is normally installed with the crown inclination of the pavement so that liquids which collect in the trough and between wiper 93 and the rolling seal flow along the length of the unit to the side of the pavement and underlying bridge structure. Such means of carrying liquid from the region of the joint can be augmented by providing weep holes in the webs of base channels 73 and 74 to suitable drain conduits which can be cast in the concrete slabs or made integral with the base channels (not shown).

The range of accommodation of the joint of FIGS. 6 through 9 is defined by the space for rolling motion of the seals 68 and 75 as described above. In practice applications the joint can be employed where the maximum width of the troughs 89 and 91 are each 3 inches. Hence, the example will accommodate a 6 inch range of expansion and contraction.

While the illustrative joint structures have been only portions representing short lengths it is to be appreciated that the joints are constructed in units of substantial length, as the width of a pavement slab and that they can be arranged with a number of units or modules in end to end relationship to accommodate the desired widths. The adjacent ends of modules can be arranged with drains such that run-off can be collected at the low end of each module. Further, the joint structure and the ends of the structure whose surface is to be accommodated for expansion need not be oriented at right angles. Thus, where longitudinal expansion of a slab of pavement having an end which is skewed to its length being accommodated the joint can be arranged to generally parallel the end while the bearing surface such as holddown fingers 83 and 84 and their receiving grooves 87 and 88 are parallel to the expansion dimension being accommodated.

In all structures illustrated, servicing of the joint can be facilitated by arranging the upper or outer plane face of the parallel faces upon which the resilient seal rolls so that it can be removed. This permits replacement of the rolling seal and cleaning of the surfaces. Each of the illustrated embodiments can be modified for this purpose by securing the outer plane face as by bolts extending into suitable tapped holes in the portion of the joint section normal to the plane face and paralleling the face of the pavement on roof slab (by means not shown).

In some applications the outer face, when loaded, may bottom its flanges on the inner face by compressing the rolling seal. Such compression will not damage the seal or impair its liquid tight integrity. The noise which otherwise would result from the impact of the flanges as 36 and 37 of FIG. 4 on face 38 can be minimized or avoided by facings of an elastomer on the ends of those flanges or by the provision of a strip corresponding to wiper 53 of FIG. 5 on the end of each flange.

It is to be appreciated that various forms of bearing surfaces for the rolling seal and various clamping means to load the seal can be employed. Further, the seal employing a rolling elastomer can be employed for other than roof and roadway joints, including curb joints where other than planar surfaces are employed in nested relation as the bearing surface for the rolling seal. Accordingly, the present disclosure is to be read as illustrative of the invention and not in a limiting sense.

I claim:

1. An expansion joint joining a pair of spaced structural elements each having generally parallel major surfaces and each of which expand and contract in the plane of said surfaces and toward and away from each other, said joint including a first section coupled to a first of said elements; a face on said first section generally paralleling said major surface of said first element, a second section coupled to the second of said elements; a face on said second section generally paralleling said face of said first section in facing relationship thereto and spaced therefrom a given distance; and an elongate, yieldable, resilient, seal of circular cross-section having a diameter greater than said given distance positioned between said first and second faces and lying with its length generally normal to the direction in which said structural elements expand and contract toward and away from each other, whereby said seal is caused to roll in contact with said faces upon relative movement of said first section and said second section.

2. A joint according to claim 1 wherein said first and second faces are planes.

3. A joint according to claim 1 including a flange protruding from one of said faces toward the other of said faces and extending generally parallel to the length of said elongate seal to provide a limit for the rolling motion of said seal on said face.

4. A joint according to claim 1 including a first flange protruding from one of said faces toward the other of said faces at one limit of the rolling motion of said seal on said face, and extending generally parallel to the length of said elongate seal and a second flange protruding from one of said faces toward the other of said faces at a limit of rolling motion of said seal on said face opposite said one limit and extending generally parallel to the length of said elongate seal.

5. A joint according to claim 4 wherein said first and second flanges are on opposed faces.

6. A joint according to claim 3 wherein said flange is on said joint section having the outermost face relative to the surfaces of said structural elements and wherein said flange is at the distal edge of said section from the coupling of its section to its supporting structural element whereby said flange tends to bar admission of foreign matter to the vicinity of contact of said seal and said faces.

7. A joint according to claim 6 including a lip on the outer end of said flange having an inclined surface generally normal to the direction in which said structural elements expand and contract toward and away from each other, a projection of which extending away from said face of said opposite joint section to the section supporting said flange forms an obtuse supplementary angle with said opposite joint section face to provide a camming surface on the leading portion of said flange whereby foreign matter tends to be barred from the vicinity of contact of said seal and said faces.

8. A joint according to claim 6 including a resilient, compressible gasket protruding from said flange toward and into contact with said face on said opposite joint section opposite the face from which said flange extends whereby foreign matter tends to be barred from the vicinity of contact of said seal and said faces.

9. A joint according to claim 1 including means to impose and maintain a load on said seal by imposing forces on said opposed faces tending to move them toward each other.

10. A joint according to claim 9 wherein said loading means comprises a plurality of first bearing surfaces on one of said sections behind said face of said section and arranged to provide linear slides; a clamp extending from said section opposite said one section into the region of said first bearing surfaces; and a plurality of second bearing surfaces supported by said clamp and engaging said first bearing surfaces, said second surface being adapted to reciprocate on said first surfaces in the dimension to be accommodated for expansion and contraction.

11. A cover for a joint between structural members adapted to move toward and away from each other comprising a pair of base members each secured to one of said structural members and spaced from each other across the separation between said structural members; a cover for spanning said separation; a plane surface extending parallel to the joint along each of said base members on a face opposing said cover; a plane surface on said cover on a face opposing said base planes; and an elongated, yieldable, resilient member of circular cross section positioned between each of said base plane surfaces and said cover plane surface and extending in its longitudinal dimension generally parallel to the separation between said structural members, whereby said seal is caused to roll in contact with said faces upon relative movement of said first section and said second section.

12. A combination according to claim 11 including a holddown means secured to said cover and engaging each of said base members to impose a force tending to move said face of said cover toward the faces on said base members and to compress said resilient member.

13. A combination according to claim 12 wherein said holddown means comprises a bearing surface on each of said base members behind said plane face portions of said base members; a plurality of fingers slidingly engaging each base member on said bearing surfaces; and a releasable coupling between said fingers and said cover whereby said cover can be removed for servicing said resilient members.

14. A combination according to claim 11 including a flange bounding each base member plane face adjacent and parallel to said separation between said structural members and extending toward said plane surface on said cover to limit rolling motion of said resilient members to said faces.

15. A combination according to claim 11 including a longitudinal flange parallel to said separation between said structural members bounding each side of the plane face on said cover in the region opposite said plane faces on said base members and extending toward said plane surfaces on said base members.

16. A combination according to claim 15 including a wiper gasket on the distal portion of each flange and adapted to wipe a respective plane face of a base member during relative movement between said structural members.

17. A combination according to claim 15 wherein said flanges are at the limits of said cover transverse of said joint and including a lip on the outer face of each flange having an inclined surface, a projection of which extending toward said cover plane face forms an obtuse supplementary angle with the face to provide a camming surface on the leading portion of each flange whereby foreign matter tends to be freed from said adjacent base faces.

References Cited

UNITED STATES PATENTS

| | | | |
|---|---|---|---|
| 3,270,474 | 9/1966 | Driggers | 52—395 |
| 3,372,521 | 3/1968 | Thom | 52—395 |
| 3,390,501 | 7/1968 | Driggers | 52—395 |
| 3,417,528 | 12/1968 | Hallock | 52—367 |
| 3,474,589 | 10/1969 | Cheatwood | 94—18X |

JACOB L. NACKENOFF, Primary Examiner

U.S. Cl. X.R.

52—395